Figure 6:
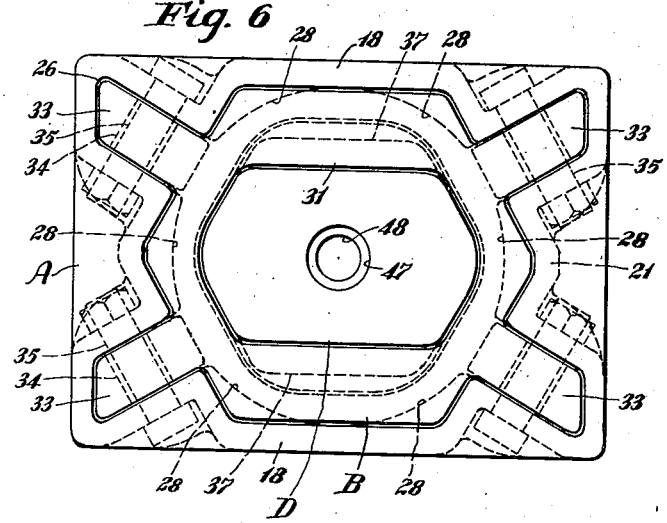

Aug. 4, 1942.     R. J. OLANDER     2,291,831
FRICTION SHOCK ABSORBING MECHANISMS
Filed Feb. 15, 1941      3 Sheets-Sheet 1
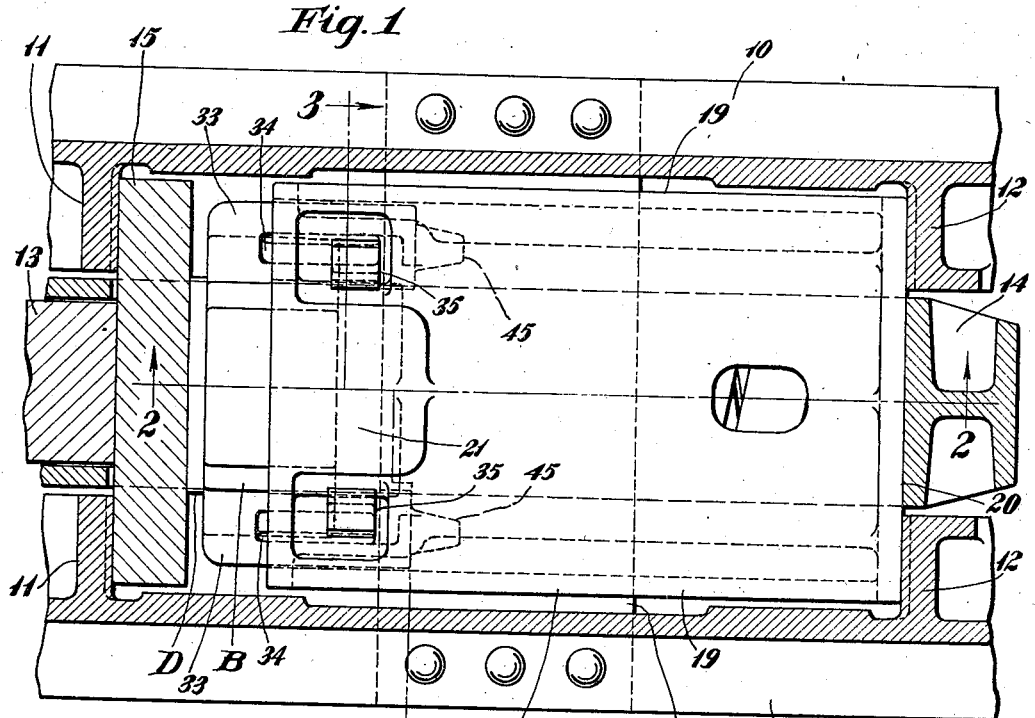
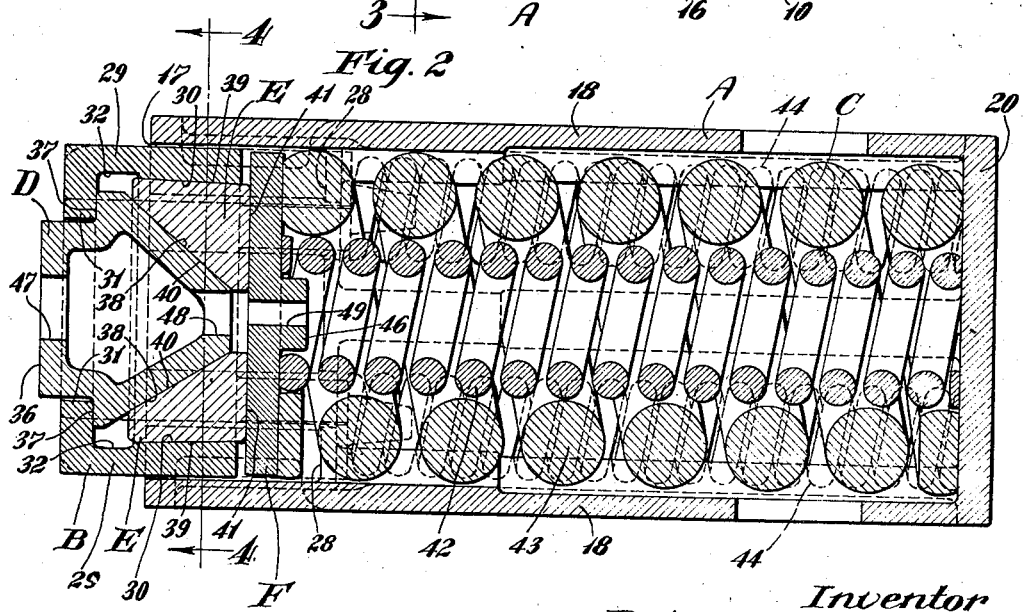
Inventor
Roland J. Olander
By Henry Fuchs.
Atty.

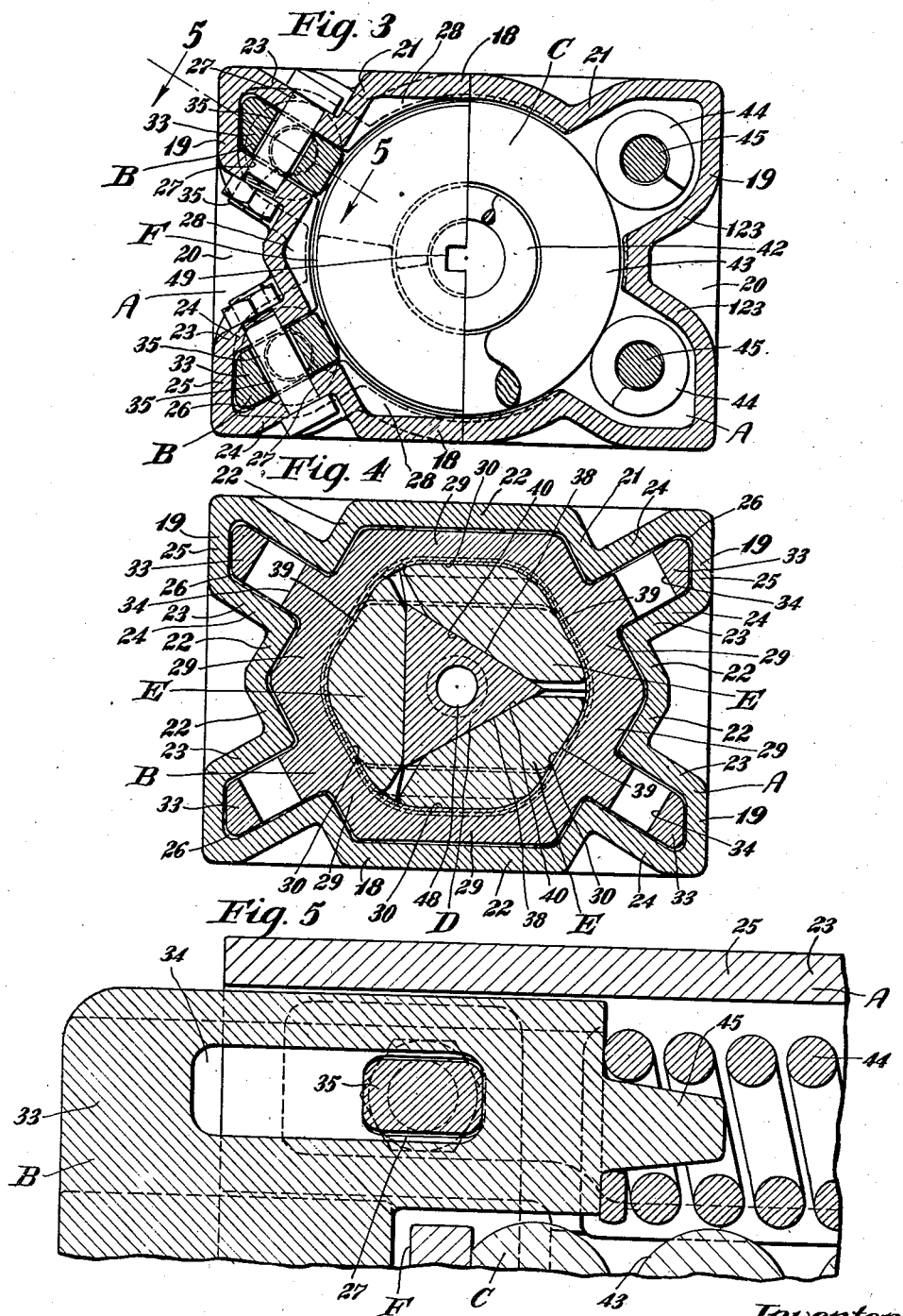

Aug. 4, 1942.                R. J. OLANDER                 2,291,831
                    FRICTION SHOCK ABSORBING MECHANISMS
                         Filed Feb. 15, 1941        3 Sheets-Sheet 3

Inventor
Roland J. Olander
By Henry Fuchs.
Atty.

Patented Aug. 4, 1942

2,291,831

UNITED STATES PATENT OFFICE 2,291,831

FRICTION SHOCK ABSORBING MECHANISM

Roland J. Olander, Chicago, Ill., assignor to W. H. Miner, Inc., Chicago, Ill., a corporation of Delaware Application February 15, 1941, Serial No. 379,012

5 Claims. (Cl. 213—24)

This invention relates to improvements in friction shock absorbing mechanisms.

One object of the invention is to provide a friction shock absorbing mechanism, especially adapted for railway draft riggings, having high free spring capacity to absorb the usual lighter shocks to which the mechanism is subjected in service, and frictional resistance to absorb unusually heavy shocks, wherein the mechanism includes a spring cage, a friction shell having limited relative movement with respect to the cage, the friction shell having friction means cooperating therewith, spring means resisting relative movement of the shell and cage including a spring opposing relative movement of the friction shell and friction means after movement of the shell has been limited, and stop means interiorly of the casing against which the shell strikes to limit movement of the latter with respect to said cage.

A further object of the invention is to provide a friction shock absorbing mechanism having preliminary free spring action wherein the frictional resistance is produced by a spring resisted friction clutch and a cooperating friction shell within which the clutch is slidable, and the free spring action is produced by relative movement of the shell and cage, the shell being connected to the cage by rugged anchoring means permitting the required relative movement.

A more specific object of the invention is to provide a friction shock absorbing mechanism, as set forth in the preceding paragraph, wherein the anchoring means comprises a plurality of rearwardly extending arms on the friction shell, slidably guided in ways provided in the cage, and bolts or keys fixed to the cage and engaged within slots in said arms to provide the limited lost motion between said shell and cage.

Other objects of the invention will more clearly appear from the description and claims hereinafter following.

In the drawings forming a part of this specification, Figure 1 is a horizontal longitudinal sectional view of a portion of the underframe structure of a railway car, showing the draft sills, and illustrating my improved shock absorbing mechanism in connection therewith, the shock absorbing mechanism being shown in plan. Figure 2 is a vertical sectional view, on an enlarged scale, of the improved shock absorbing mechanism only, corresponding substantially to the line 2—2 of Figure 1. Figure 3 is a transverse vertical sectional view in two different planes, corresponding substantially to the offset line 3—3 in Figure 1. Figure 4 is a transverse vertical sectional view, corresponding substantially to the line 4—4 of Figure 2. Figure 5 is a sectional view, on a still further enlarged scale, corresponding substantially to the line 5—5 of Figure 3 and showing the structure at one corner of the friction shell and casing of the mechanism. Figure 6 is a front elevational view of the improved friction shock absorbing mechanism shown in Figures 1 and 2.

In said drawings 10—10 indicate the channel-shaped center or draft sills of a railway car, of well-known design, on the inner sides of which are formed the usual front and rear stop lugs 11—12. The inner end portion of the coupler shank is indicated by 13, to which is operatively connected a yoke 14 of well-known design, within which is disposed the improved shock absorbing mechanism proper and a front main follower 15. The yoke is supported by the usual detachable saddle plate 16 secured to the draft sills.

My improved shock absorbing mechanism comprises broadly a spring cage A; a friction shell B; a spring resistance C within the cage A; a wedge block D; three friction shoes E—E—E; and a spring follower plate F.

The spring cage A is in the form of a substantially rectangular boxlike casing open at its front end, as indicated at 17, and having vertically spaced top and bottom walls 18—18, laterally spaced side walls 19—19, and a vertically disposed transverse wall 20 closing the rear end of the casing. The casing or cage A is of such a width that it practically fills the pocket between the sills 10—10, only slight clearance being provided between the sides of the casing and the sills.

At the forward end of the casing a section 21 of broadly hexagonal transverse cross section is provided, defined by six walls 22—22 disposed symmetrically about the central longitudinal axis of the casing, two opposed walls of said hexagonal section being disposed horizontally and forming the top and bottom walls thereof and the remaining walls being arranged in pairs at the sides of the casing, the walls of each pair being disposed at an angle of 120° with respect to each other and inclined outwardly away from said top and bottom walls respectively at angles of 120°. The section 21 serves as a guideway accommodating the friction shell B for sliding movement in a direction lengthwise of the mechanism. At the four corners of the casing A, the section 21 thereof is provided with hollow wing-like portions 23—23 outstanding respectively from each of the walls of the pairs of side walls 22—22. As shown in Figure 4, these wings extend in directions radial to the central longitudinal axis of the casing and at substantially right angles to the corresponding walls 22. Each wing comprises two spaced parallel side walls 24—24 and an outer end wall 25. The space between the side walls 24—24 of each wing 23 presents a guideway 26 for a guide arm on the friction shell B, hereinafter described. As shown most clearly in Figures 3 and 4 the guideway 26 of each wing 23 opens through the corresponding wall 22 of the section 21 of the casing A. The opposed walls 24—24 of each wing are provided with aligned openings 27—27, as shown most clearly in Figures 1, 3, and 5 for a purpose hereinafter described.

Rearwardly of the section 21, the top, bottom, and side walls 18—18—19—19 of the casing A are of the sectional contour shown at the right hand half section of Figure 3, the wings being widened out, as shown, said widened portions being indicated at 123—123 and providing pockets adapted to accommodate certain elements of the spring resistance C, as hereinafter described.

The rear wall 20 of the casing A protrudes outwardly beyond the inset portions of the top, bottom, and side walls of said casing, as clearly shown in Figure 3, thus providing a rear follower portion of substantially rectangular outline integral with the casing. This follower portion forms the rear follower of the draft rigging and cooperates with the rear stop lugs 12—12 in the usual manner.

At the forward end of the casing A, the section 21 thereof is provided with transversely extending webs spanning the spaces between the wings 23 and the walls 22 of said section to form a rectangular platelike flange member or reenforcing portion, at the forward end of the casing, corresponding in size to the rear follower portion formed by the rear wall 20. At the inner end of the hexagonal section 21 of the casing A, at each of the corners thereof, interiorly of the casing, a transverse abutment shoulder 28 is provided, the metal of the walls of the casing being suitably thickened at this point to provide said shoulder. The abutment faces of the six shoulders 28 thus provided are in the same transverse plane and present a substantial stop means for limiting inward movement of the shell B, as hereinafter pointed out.

The friction shell B is in the form of a hollow sleeve of hexagonal transverse cross section and is telescoped within the guide section 21 of the casing A. The six walls of the hexagonal shell B, which are respectively indicated by 29, are arranged symmetrically about the central longitudinal axis of the mechanism with two opposed walls thereof forming the top and bottom walls which are disposed horizontally. The interior sides of the walls 29 of the shell B present six friction surfaces 30—30. The friction surfaces 30—30 converge rearwardly of the mechanism, as shown in Figure 2, thereby providing an inwardly tapered shell portion. At the forward end, the shell B is provided with top and bottom retaining flanges 31—31 which are directed laterally inwardly from the top and bottom walls 29—29 and slightly overhang the top and bottom portions of the opening at the front end of the shell B. These flanges form retaining means for the wedge member or block D of the device, as hereinafter described. As shown in Figure 2, a certain amount of clearance is provided between the flanges 31—31 and the front ends of the friction surfaces 30—30 of the shell, the interior faces of the walls 29—29 of the casing being slightly recessed at this point, as indicated at 32—32.

The shell B is provided with four guide arms 33—33—33—33 which are in the form of radially projecting flanges on the side walls 29—29 and 29—29 extending lengthwise of said walls and projecting some distance rearwardly beyond the end of the shell, as shown in Figure 5. Each guide arm 33 is longitudinally slotted, as indicated at 34. The arms 33 are accommodated for sliding movement in the guideways of the wings 23 of the section 21 of the casing A. The slots 34 of the arms 33 are in alignment with the openings 27—27 of the corresponding wings 23 of the casing A and the shell is anchored to the casing by bolts 35 extending through said openings 27—27 and slots 34. As will be evident, in addition to holding the parts assembled by anchoring the shell B to the casing A, the bolts serve as stop means for limiting outward movement of the shell with respect to the casing by engagement of the rear ends of the slots in the arms 33 with said bolts.

The wedge D is in the form of a hollow block having a flat transverse front end face 36 adapted to bear on the inner side of the front follower 15 of the draft rigging. At the forward end, the top and bottom sides of the block D are cut away, that is, the vertical dimension of the block is reduced to provide top and bottom shoulders 37—37 which engage in back of the flanges 31—31 of the shell B to limit outward movement of the wedge.

At its inner end the block D is provided with three flat wedge faces 38—38—38 which are arranged symmetrically about the longitudinal central axis of the mechanism.

The friction shoes E—E—E, which are three in number, are arranged within the friction shell B and surround the wedge D. Each shoe E has an outer friction surface 39 of transverse V-shaped cross section cooperating with two adjacent friction surfaces 30—30 of the shell. On the inner side each shoe is provided with a flat wedge face 40 correspondingly inclined to the opposed wedge face 38 of the block D and engaged therewith. At the inner end each shoe is provided with a flat transverse face 41 adapted to bear on the spring follower plate F. As shown most clearly in Figure 2, the rear ends of the shoes E—E—E normally project slightly beyond the inner end of the shell B, thereby providing a certain amount of clearance between the spring follower F and the rear end of the shell B.

The spring resistance C comprises an inner coil 42 and a surrounding relatively heavy outer coil 43 and four additional coils 44—44—44—44 disposed about said inner and outer coils and located at the four corners of the casing. The springs 44—44—44—44 are disposed within the corner pockets 123—123—123—123 of the spring cage A and have their front and rear ends bearing respectively on the inner ends of the arms 33 of the friction shell B and the rear wall 20 of the casing or cage A. The front ends of the springs 44 are preferably held centered by conical bosses or centering projections 45 on the inner ends of the arms 33 engaging within the open ends of the coils of said springs.

The rear ends of the springs 42 and 43 also bear on the end wall of the cage or casing A, while their front ends bear directly on the spring follower F which is interposed between these springs and the friction shoes E—E—E.

The spring follower plate F is in the form of a flat circular disk bearing at its forward side on the inner ends of the friction shoes E—E—E and on its rear side on the front ends of the springs 42 and 43.

The spring follower F is preferably provided with a rearwardly projecting centering boss 46 for the coil spring 42 engaging within the open front end of said coil.

In assembling the mechanism the friction clutch comprising the wedge D and the shoes E—E—E are assembled within the friction shell B and the spring follower F placed in position against the rear ends of the shoes. The shell B with the parts thus assembled therewith is then telescoped within the front end section 21 of the casing or cage A within which the springs 42 and 43 and 44—44—44—44 have first been placed. To hold the parts within the friction shell and the spring follower F in place during this assembling operation, a tool is employed which is in the form of a hook, having the shank thereof engaged through openings 47, 48, and 49, shown in Figure 2, of the wedge D and the spring follower F, and the hook thereof engaged in back of the spring follower. After telescoping the friction shell B within the casing or cage A the mechanism is placed under slight compression to bring the inner ends of the slots 34 of the arms 33 of the shell B into alignment with the bolt-receiving openings of the wings 23 of the section 21 of the casing A, and the bolts applied. The parts are preferably so proportioned that the shouldered engagement between the wedge and the shell B and between the shell B and the casing A will limit the expansion of the mechanism to hold the springs thereof under a certain amount of predetermined initial compression.

The operation of my improved shock absorbing mechanism is as follows: In a draft action the casing A is pulled forwardly by the yoke 14, compressing the mechanism against the front follower 15. In a buffing action the front follower 15 is moved rearwardly or inwardly by the coupler shank 13, thereby compressing the mechanism against the rear stop lugs 12—12, the casing A being held against rearward movement during this action by said stop lugs. Thus, upon compression of the mechanism in either draft or buff, the wedge block D will be forced inwardly toward the spring cage A. Due to the resistance offered by the springs 42 and 43 a wedging action is set up between the wedge D and the shoes E—E—E, thereby forcing the shoes into frictional contact with the interior friction surfaces of the shell B. Due to the frictional resistance thus created the shell B is compelled to move inwardly of the casing A in unison with the wedge D. This movement of the casing is directly resisted by the four springs 44—44—44—44 which bear on the shell, and indirectly by the springs 42 and 43 which bear on the spring follower which in turn bears directly on the friction shoes. Thus, during initial compression of the mechanism free spring action of the entire spring resistance is had. This action continues until inward movement of the shell B is arrested by engagement of the same with the stop shoulders 28 of the casing or cage A, whereupon the wedge and friction shoes are forced to move inwardly of the shell B against resistance of the springs 42 and 43. High frictional resistance is thus had during the last part of the compression stroke of the mechanism. Compression of the mechanism is ultimately limited by engagement of the front follower 15 with the front end of the cage A, whereupon the force is transmitted through the cage or casing A to the rear stop lugs, the casing acting as a solid column to transmit the load and relieve the springs of the shock absorbing mechanism from undue compression.

When the actuating force is reduced the parts are returned to the normal position shown in Figures 1 and 2, by the springs 42, 43, and 44, outward movement of the shell B being limited by the bolts 35 and outward movement of the wedge D being in turn limited by shouldered engagement thereof with the retaining flanges 31—31 of the shell B.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a spring cage; of a friction shell telescoped within one end of the cage for movement lengthwise thereof; rearwardly extending arms on said shell; guideways on said cage within which said arms are slidable; longitudinal slots in said arms; pins fixed to said cage and extending into the slots of said arms for anchoring the shell to the cage; a friction clutch slidable lengthwise within the shell; stop means on the cage limiting inward movement of the shell; springs within the cage bearing on the inner ends of said arms to resist inward movement of the shell; and additional spring means within the cage yieldingly opposing relative movement of the clutch and shell.

2. In a friction shock absorbing mechanism, the combination with a spring cage having a guide section at the forward end of hexagonal cross section; of four guide wings radially projecting from four of the walls of said guide section; a friction shell of hexagonal shape slidable in said guide section of the cage; guide arms at the sides of the shell corresponding to the sides of the guide section of the cage which are provided with guide wings, said arms being slidably guided in said wings, said arms having longitudinally extending guide slots closed at their rear ends; retaining pins fixed to said wings and extending into the guide slots of said arms to anchor the shell to the cage and limit outward movement of the shell by engagement with the closed ends of said slots; a friction clutch slidable within the shell; and spring resistance means within the cage opposing inward movement of the friction shell, and relative movement of the shell and clutch.

3. In a friction shock absorbing mechanism, the combination with a spring cage having a guide section at the forward end of hexagonal cross section, said hexagonal section including opposed horizontally disposed top and bottom walls, and pairs of opposite side walls, said side walls having outstanding guide wings radial to the longitudinal central axis of the cage, said guide wings having longitudinally extending guideways; of a friction shell of hexagonal shape telescoped within said guide section of the cage, said hexagonal shell being defined by horizontally disposed top and bottom walls and pairs of opposite side walls, said side walls having projecting guide flanges thereon engaged within said guideways of the wings of the cage to guide the shell for sliding movement lengthwise of the cage, said shell having rearwardly extending arms forming continuations of said guide flanges; stop means at the inner end of the guide section of the cage engageable by the rear end of the shell for limiting inward movement of the latter; a friction clutch slidable in said shell; spring elements in the cage opposing inward movement of the shell; and additional spring elements within the cage yieldingly resisting relative movement of the clutch and shell.

4. In a friction shock absorbing mechanism, the combination with a spring cage comprising front and rear sections, said front section being of substantially hexagonal cross section, said rear section having top, bottom and side walls, said rear section having spring receiving pockets at the corners formed by the meeting portions of said side and top and bottom walls, said hexagonal section being defined by top and bottom walls forming continuations of said top and bottom walls of the rear section of the cage, and pairs of side walls forming continuations of said side walls of said rear section; of guide wings extended from the pairs of side walls of said front section, said wings being radial to the longitudinal central axis of the cage, each of said wings having spaced side walls defining a guideway therebetween, said guideways being continuations of said spring pockets; a friction shell of hexagonal shape telescoped within said front section of the cage for movement lengthwise of the cage; arms on said shell corresponding in number to the guide wings of the cage, said arms being slidably guided in the guideways of said wings; stop shoulders at the inner end of said front section of the cage at the six corners thereof, said stop shoulders being engageable by said shell to limit inward movement of the latter; a friction clutch slidable in said shell; central spring means in the cage opposing relative movement of the clutch and shell; and four spring elements disposed about said central spring means within the spring pockets of the cage, said last named springs bearing on the inner ends of the arms of the shell to yieldingly oppose inward movement of the shell.

5. In a friction shock absorbing mechanism as set forth in claim 4, means for anchoring the shell to the cage comprising slots in the arms of the shell and retaining pins fixed in the walls of the wings and extending through the slots of said arms.

ROLAND J. OLANDER.